United States Statutory Invention Registration [19]

[11] Reg. Number: H499

Lin [43] Published: Jul. 5, 1988

[54] SYSTEM AND METHOD FOR LINEARLY AMPLIFYING OPTICAL ANALOG SIGNALS BY BACKWARD RAMAN SCATTERING

[75] Inventor: Cheng-Heui Lin, Goleta, Calif.

[73] Assignee: The United States of America as represented by the United States Department of Energy, Washington, D.C.

[21] Appl. No.: 902,839

[22] Filed: Sep. 2, 1986

[51] Int. Cl.[4] ..... H01S 3/00; H01S 3/30

[52] U.S. Cl. ..... 330/4.3; 372/3

[58] Field of Search ..... 372/3, 6; 350/96.15, 350/96.16; 330/4.3

[56] References Cited

U.S. PATENT DOCUMENTS

| | | | |
|---|---|---|---|
| H15 | 1/1986 | Chraplyvy | 372/3 |
| 3,515,897 | 6/1970 | Culver . | |
| 3,705,992 | 12/1972 | Ippen et al. . | |
| 3,875,422 | 4/1975 | Stolen | 372/6 X |
| 4,039,851 | 8/1977 | Jain et al. | 372/3 X |
| 4,063,106 | 12/1977 | Ashkin et al. | 372/3 X |
| 4,389,617 | 6/1983 | Kurnit . | |
| 4,394,623 | 7/1983 | Kurnit | 330/43 |
| 4,401,364 | 8/1983 | Mochizuki | 350/96.16 |
| 4,523,315 | 6/1985 | Stone | 372/3 |
| 4,616,898 | 10/1986 | Hicks, Jr. | 350/96.16 X |

*Primary Examiner*—Stephen C. Buczinski
*Assistant Examiner*—Linda J. Wallace
*Attorney, Agent, or Firm*—Clifton E. Clouse; Roger S. Gaither; Judson R. Hightower

[57] ABSTRACT

A system for linearly amplifying an optical analog signal by backward stimulated Raman scattering comprises a laser source for generating a pump pulse; and an optic fiber having two opposed apertures, a first aperture for receiving the pump pulse and a second aperture for receiving the optical analog signal, wherein the optical analog signal is linearly amplified to an amplified optical analog signal.

16 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SYSTEM AND METHOD FOR LINEARLY AMPLIFYING OPTICAL ANALOG SIGNALS BY BACKWARD RAMAN SCATTERING

The Government has rights in this invention pursuant to Contract No. DE-AC08-83NV10282 awarded by the U.S. Department of Energy.

BACKGROUND OF THE INVENTION

This invention relates to systems for amplifying optical signals and, more particularly, to a system and method for linearly amplifying optical analog signals by backward stimulated Raman scattering.

There are instances where weak electromagnetic energy, especially optical signals, must be amplified after the signals have traveled a long distance. Such application may include the detection and measurement of optical signals which are generated in a deep hole or a tunnel. These optical signals may be generated, for example, by an underground explosion. One of such optical signals may be the intensity of radiation of chemical compounds.

A conventional technique is to use an opto-electrical transducer for transforming such optical signals into the appropriate electrical signals. The electrical signals are then transmitted on a conventional metallic coaxial cable the other end of which is connected to a conventional detector. Such a technique has several disadvantages. One disadvantage is that such a metallic cable has an inherent characteristic of eliminating the high frequency components of a signal, resulting in the distortion of the time duration of the signal after it has traveled through the entire length of the coaxial cable, e.g., one kilometer. An analog electrical signal having a time duration of one nanosecond could be stretched into a signal of a few tens of nanoseconds; a signal having a time duration of one nanosecond is generally stretched to three nanoseconds after travelling approximatel 300 feet. In addition, the amplitude of the signal will also be lost after travelling such a long distance. Moreover, metallic cables tend to add noise to the desired electrical signal. In addition to the fact that metallic cables are expensive and heavy, it is capable of conducting lightning into the underground test site, causing damage to other equipment.

A second technique in detecting analog optical signals is to use optic fibers in conjunction with equipment such as spectral equalizers. One inherent disadvantage of such an optic fiber is its propensity to stretch out the time duration of the broad-spectrum optical signal. In addition, the optical signals generated by the underground explosion invariably have insufficient intensity such that detecting that intensity at one frequency is frequently impossible. Spectral equalizers are therefore used to compensate for the lack of intensity. A conventional spectral equalizer utilizes 10 fibers each of which is conducting a particular frequency of the generated optical signal. The optical signal is first grated into ten frequencies before each of the frequencies is fed into a fiber. Each of the fibers has a different length so as to compensate for the velocity of each frequency such that all frequencies of the optical signal arrive at the detector of the spectral equalizer at the same time. The intensities of all the frequencies are then accumulated such that the combined intensity can be detected. The combined intensity, however, is not a true amplification of the optical signal, but rather, an accumulation of the intensities of that signal. This technique is capable of increasing the intensity by approximately three times. Since the spectral equalizer is only capable of slightly increasing the intensity of the optical signal, informational contents of the optical signal are frequently lost. For example, if the optical signal is the intensity of radiation of a chemical compound, that signal contains spectral information that could be deciphered by spectroscopic equipment. Another disadvantage in using spectral analyzers is that such equipment requires extensive calibration and manpower support.

A third technique is to digitize the detected optical signal. In such a technique, the presence of such a digital optical signal represents the occurrence of an optical event. It, however, is incapable of presenting other informational contents of the optical signal such as the fast-varying, detailed spectral data or the time profile of that signal when that information is desired. In amplifying such a digital optical signal, the signal is transmitted in a conventional optic fiber the other end of which is connected to a laser source. In conjunction with the emitted laser beam from the laser source, the optic fiber facilitates amplification of the digital optical signal by stimulated Raman scattering. Another disadvantage of such a technique is its inherent inability to digitize high frequency optical signals.

SUMMARY OF THE INVENTION

An ideal system for linearly amplifying optical analog signals must be capable of maintaining the time profiles of the optical analog signals, i.e., amplifying an optical analog signal in a linear fashion. Linearity in the present invention is defined as the amplified replication of an original signal. Since the intensity of the optical analog signal is generally faint after having travelled a long distance, the ideal system should also be capable of amplifying optical analog signals in the range of a few microwatts to several milliwatts. Moreover, the ideal system should be capable of having gains of at least approximately 30 dB.

It is a major object of the present invention to provide a system for linearly amplifying optical analog signals by backward stimulated Raman scattering, that is, the preservation of the timing profile of an optical analog signal.

It is another object of the present invention to provide a system for linearly amplifying optical analog signals by backward stimulated Raman scattering in which optical analog signals in the range of a few microwatts to several milliwatts are amplified.

It is a further object of the present invention to provide a system for linearly amplifying optical analog signals by backward stimulated Raman scattering that is capable of amplifying the optical analog signals by at least approximately 30 dB.

In order to accomplish the above and still further objects, a system for linearly amplifying optical analog signals by backward stimulated Raman scattering is provided. The system comprises a laser source for generating a pump pulse, and an optic fiber having two opposed apertures, a first aperture for receiving the pump pulse and a second aperture for receiving the optical analog signal, wherein the optical analog signal is linearly amplified to an amplified optical analog signal. The gain of the system is at least 30 dB. In the preferred embodiment, the system comprises a beamsplitter, a first lens for coupling the pump pulse into the optic fiber, a second lens for coupling the optical analog signal into the optic fiber, a narrowband filter for filtering the amplified optical analog signal, a detector and an oscilloscope.

Other objects, features and advantages of the present invention will appear from the following detailed description of the best mode of a preferred embodiment, taken together with the accompanying drawings.

DETAILED DESCRIPTION OF THE INVENTION

Figure 1:
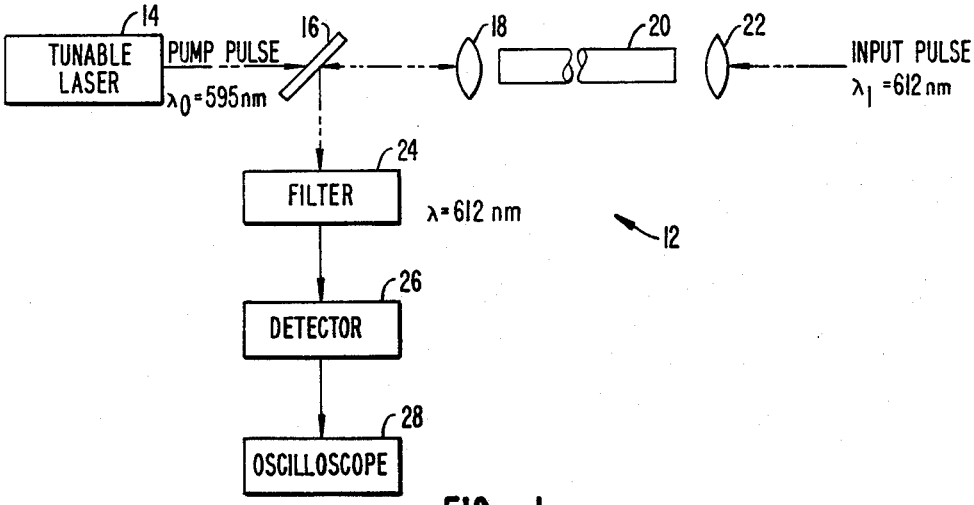
FIG. 1 is a diagrammatical block diagram of a system for linearly amplifying optical analog signals by backward stimulated Raman scattering of the present invention.

Referring to FIG. 1, there is shown a system for linearly amplifying optical analog signals by backward stimulated Raman scattering, designated 12. System 12 includes a conventional tunable laser 14, a conventional beamsplitter 16, a first lens 18, an optic fiber 20, a second lens 22, a narrowband filter 24, a detector 26, and an oscilloscope 28. More particularly, tunable laser 14 is a conventional tunable dye laser for generating a pump pulse. Laser 14 in the preferred embodiment is a flashlamp-pumped dye laser that is tuned to a wavelength $\lambda_0$ of 595 nanometers. The pulse width of the pump pulse is approximately 4 microseconds in duration. The pulse width in the present invention is defined as the full width, half maximum (FWHM) amplitude of a pulse. The pump pulse passes through conventional beamsplitter 16 and enters into lens 18 which is used to couple the pump pulse into optic fiber 20. Optic fiber 20 in the preferred embodiment is a conventional glass fiber of approximately 500 meters in length and 65 microns in diameter. Fiber 20 in the preferred embodiment is also the Raman medium.

Positioned at the other end of fiber 20 is lens 22 which is used to couple an input, optical analog pulse into fiber 20. Input pulse in the preferred embodiment has a wavelength $\lambda_1$ of approximately 612 nanometers and a pulse width, i.e., FWHM, of approximately 10 nanoseconds. Input pulse may be a single, high frequency, optical analog signal generated by an underground explosion. Such a single input pulse is generally referred to as a single transient. The input pulse contains informational contents such as the spectral data relating to the intensity of radiation of a chemical compound. In such spectra data, the profile of the optical analog signal is of the utmost importance.

Pump pulse generates stimulated Raman scattering in fiber 20 such that the analog input pulse is amplified as it travels through the entire length of fiber 20. The opposed directions of travel of the pump pulse and the input pulse engender the nomenclature "backward Raman scattering." Raman scattering occurs when the pump pulse excites the molecules of the Raman medium to higher excited energy states such that the input pulse induces the excited medium to a lower state. The energy released by the molecules as they travel from the highest energy state to the lower state amplify the input pulse. The lower state, however, is still higher than the initial ground state of the Raman medium. The pump pulse in the preferred embodiment should be kept below one kilowatt so as to prevent the self-generation of unnecessary Raman scattering such that it interferes with the detection of the amplified input pulse. The capability of a high-energy pump pulse to generate Raman scattering without the assistance of the Raman medium is a phenomenon understood by those skilled in the art.

The amplified input pulse then travels through lens 18 and is reflected by beamsplitter 16. The amplified input pulse, filtered by narrowband filter 24, is then detected by a detector 26. In the preferred embodiment, filter 24 is set to transmit radiation at a wavelength of 612 nanometers so as to eliminate undesired scattered light. Detector 26 in the preferred embodiment is a conventional photodiode. Photodiode 26 then linearly transduces the amplified optical input pulse to an electrical signal and forwards it to oscilloscope 28 for display.

The relationship of the wavelength of the pump pulse, $\lambda_0$, and the wavelength of the input pulse, $\lambda_1$, is as follows:

$$\frac{1}{\lambda_0} = \frac{1}{\lambda_1} + k_R,$$

where $k_R$ is the Raman shift in wave numbers, i.e., the difference between the energy of the initial ground state and the ultimate lower state. The wavelength of the input pulse is the first order Stokes shift of the wavelength of the pump pulse. Since the wavelength of the input pulse, $\lambda_1$, and the relationship of the Stokes shift are known quantities, only the wavelength of the pump pulse $\lambda_0$, needs to be adjusted. Such adjustments are readily accomplished by using tunable laser 14.

In addition, the essential relationship between the length of optic fiber 20 and the time durations of pump pulse, $T_0$, and input pulse, $T_1$, is as follows:

$$\frac{Ln}{c} >> T_1,$$

$$T_0 >> T_1,$$

where

L is the length of fiber 20, n is the index of refraction of fiber 20, and c is the speed of light.

The latter two equations represent the necessary conditions for linear amplification.

Figure 2A:
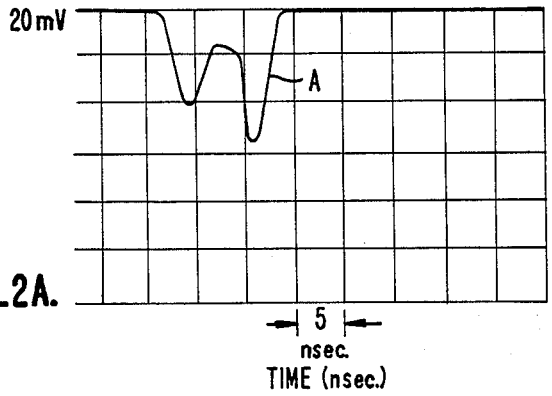
FIGS. 2A and 2B are graphs illustrating the linearity capability of the system of FIG. 1.
Figure 2B:
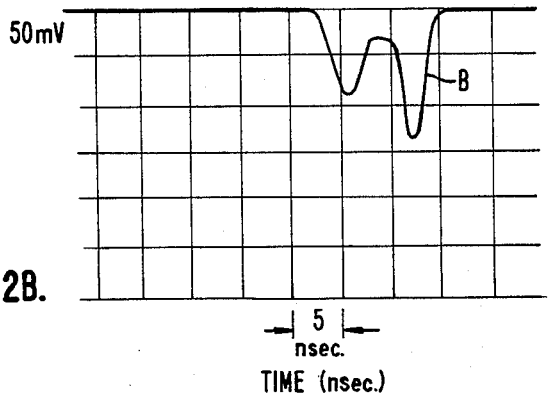

FIGS. 2A and 2B illustrate the linearity capability of the present invention. An input pulse of approximately 60 millivolts in amplitude and 15 nanoseconds in duration, designated "A," is shown in FIG. 2A. Waveform A has two peaks which could be representing spectral data. After amplification in fiber 20, an amplified input pulse of approximately 150 millivolts and a time profile of approximately 15 nanoseconds is generated, designated "B". The 200 mV amplified input pulse of FIG. 2B does not represent the actual amplification of the input signal. In actuality, the original input pulse was amplified 1000 times, and then attentuated 400 times so as to permit waveform B to be graphed in this side-by-side comparison. Waveform B also contains the two peaks, illustrating the preservation of the time profile.

Figure 3:
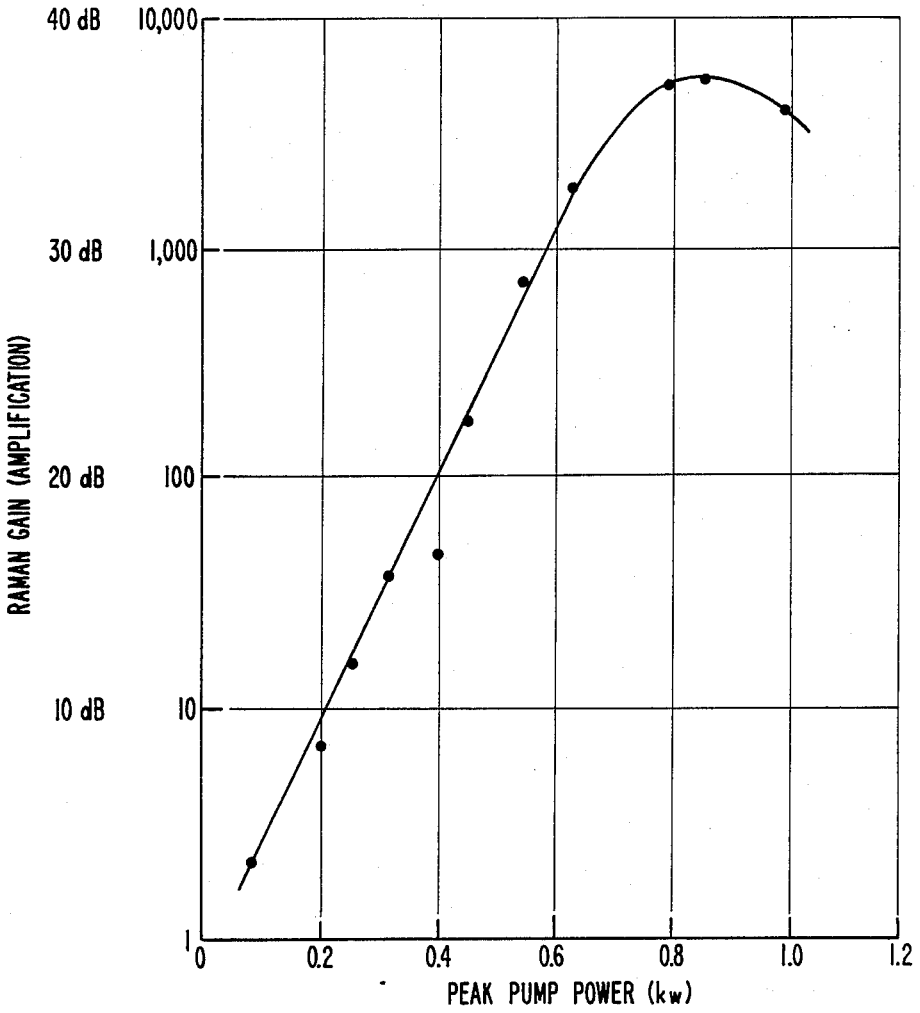
FIG. 3 is a graph illustrating the amplification capability of the system of FIG. 1.

As illustrated in FIG. 3, the present invention is capable of amplifying the input signal to gains of 30 dB or higher. For example, a pump pulse having a peak power of approximately 0.6 kilowatt can amplify an input pulse to approximately 30 dB. The input pulse is generally in the range of a few microwatts to several milliwatts.

It will be apparent to those skilled in the art that various modifications may be made within the spirit of the invention and the scope of the appended claims. For example, although the wavelength illustrated in the present invention is in the visible range, this invention can be used in the infrared wavelength region. To minimize slight frequency degradation of the signals in fiber 20, fiber 20 may be selected to have the appropriate multimode or single mode characteristics. Or, a fiber 20 of smaller diameter may be used with higher frequency signals. Moreover, the length of fiber 20 is dependent on the application; for example, 700–1000 meters.

What is claimed is:

1. A system for linearly amplifying an optical analog signal by backward Raman scattering, comprising:

a laser source for generating a pump pulse; and an optic fiber having two opposed apertures, a first aperture for receiving the pump pulse and a second aperture for receiving the optical analog signal, wherein the length of said optic fiber is selected to be:

$$Ln/c >> T_1,$$

where

L is the length of said optic fiber, n is the index of refraction of said optic fiber, c is the speed of light, and $T_1$ is the time duration of the optical analog signal, and wherein the pump pulse has duration $T_0$ selected to satisfy the relation $T_0 >> T_1$, so that the optical analog signal is linearly amplified to an amplified optical analog signal.

2. The system as claimed in claim 1, wherein the wavelength of the pump pulse is set at:

$$\frac{1}{\lambda_0} = \frac{1}{\lambda_1} + k_R,$$

where $\lambda_0$ is the wavelength of the pump pulse, $\lambda_1$ is the wavelength of the optical analog signal, and $k_R$ is the Raman shift in wave numbers.

3. The system as claimed in claim 1, wherein said optic fiber and the pump pulse cooperatively amplify the optical analog signal to gains of at least 30 dB.

4. The system as claimed in claim 1, further comprises a beamsplitter;

a first lens for coupling the pump pulse into the first aperture of said optic fiber;

a second lens for coupling the optical analog signal into the second aperture of said optic fiber; and a narrowband filter for filtering the amplified optical analog signal.

5. The system as claimed in claim 4, wherein the amplified optical analog signal exits said optic fiber at the first aperture of said optic fiber.

6. The system of claim 1, wherein the length L is at least 500 meters, the wavelength of the pump pulse is substantially equal to 595 nanometers, the wavelength of the optical analog signal is substantially equal to 612 nanometers, and the pump pulse has power less than one kilowatt, so as to prevent self-generation of unnecessary Raman scattering.

7. A system for linearly amplifying an optical analog signal by backward Raman scattering, comprising:

a laser source for generating a pump pulse; and an optic fiber having two opposed apertures, a first aperture for receiving the pump pulse traveling in a first direction and a second aperture for receiving the optical analog signal traveling in a second direction that is opposed to the first direction, wherein the length of said optic fiber is selected to be:

$$(Ln/c) >> T_1,$$

where

L is the length of said optic fiber, n is the index of refraction of said optic fiber, c is the speed of light, and $T_1$ is the time duration of the optical analog signal, and wherein the pump pulse has duration that is selected pursuant to $$T_0 >> T_1,$$

where $T_0$ is the time duration of the pump pulse, so that the optical analog signal is linearly amplified to an amplified optical analog signal.

8. The system as claimed in claim 7, wherein the relationship between the wavelength of the pump pulse is set at:

$$\frac{1}{\lambda_0} = \frac{1}{\lambda_1} + k_R,$$

where $\lambda_0$ is the wavelength of the pump pulse, $\lambda_1$ is the wavelength of the optical analog signal, and $k_R$ is the Raman shift in wave numbers.

9. The system as claimed in claim 8, wherein said optic fiber and the pump pulse cooperatively amplify the optical analog signal to gains of at least 30 dB.

10. The system as claimed in claim 9, further comprises a beamsplitter;

a first lens for coupling the pump pulse into the first aperture of said optic fiber;

a second lens for coupling the optical analog signal into the second aperture of said optic fiber; and a narrowband filter for filtering the amplified optical analog signal.

11. The system as claimed in claim 10, wherein the amplified optical analog signal exits said optic fiber at the first aperture of said optic fiber.

12. The system as claimed in claim 11, wherein the length L of said optic fiber is at least 500 meters;

the wavelength $\lambda_0$ of the pump pulse is 595 nanometers;

the wavelength $\lambda_1$ of the optical analog signal is 612 nanometers; and the wavelength of said narrowband filter is 612 nanometers.

13. A method of linearly amplifying an optical analog signal in an optic fiber by backward Raman scattering, comprising the steps of:

supplying a pump pulse into said optic fiber in a first direction, wherein the length of said optic fiber is selected to be:

$$Ln/c >> T_1,$$

where

L is the length of said optic fiber, n is the index of refraction of said optic fiber, c is the speed of light, and $T_1$ is the time duration of the optical analog signal, and wherein the pump pulse is selected to have time duration $T_0$ satisfying the relationship $T_0 >> T_1$; and supplying the optical analog signal into said optic fiber in a second direction that is opposed to the first direction such that the optical analog signal is linearly amplified.

14. The method as claimed in claim 13, wherein the wavelength of the pump pulse is set at:

$$\frac{1}{\lambda_0} = \frac{1}{\lambda_1} + k_R,$$

where $\lambda_0$ is the wavelength of the pump pulse, $\lambda_1$ is the wavelength of the optical analog signal, and $k_R$ is the Raman shift in wave numbers.

15. The method as claimed in claim 14, wherein said optic fiber and the pump pulse cooperatively amplify the optical analog signal to gains of at least 30 dB.

16. The method as claimed in claim 15, wherein the length L of said optic fiber is at least 500 meters;

the wavelength $\lambda_0$ of the pump pulse is 595 nanometers, and the wavelength $\lambda_1$ of the optical analog signal is 612 nanometers.

* * * * *